(12) United States Patent
Gulli' et al.

(10) Patent No.: US 9,811,102 B2
(45) Date of Patent: Nov. 7, 2017

(54) SYSTEM AND METHODS FOR MONITORING AND REDUCING THE CONSUMPTION OF ELECTRICITY WITH A NETWORK OF SMART SENSORS

(71) Applicants: Antonino Gulli', Pisa (IT); Lorenzo Gulli', Pisa (IT); Leonardo Alessandro Gulli', Pisa (IT); Aurora Gulli', Pisa (IT)

(72) Inventors: Antonino Gulli', Pisa (IT); Lorenzo Gulli', Pisa (IT); Leonardo Alessandro Gulli', Pisa (IT); Aurora Gulli', Pisa (IT)

(*) Notice: Subject to any disclaimer, the term of this patent is extended or adjusted under 35 U.S.C. 154(b) by 400 days.

(21) Appl. No.: 14/448,489

(22) Filed: Jul. 31, 2014

(65) Prior Publication Data

US 2016/0033985 A1 Feb. 4, 2016

(51) Int. Cl.
| | | |
|---|---|---|
| *G05D 3/12* | (2006.01) |
| *G05D 5/00* | (2006.01) |
| *G05D 9/00* | (2006.01) |
| *G05F 1/66* | (2006.01) |
| *G06N 99/00* | (2010.01) |

(52) U.S. Cl.
CPC ............. *G05F 1/66* (2013.01); *G06N 99/005* (2013.01)

(58) Field of Classification Search
CPC ................................ G05F 1/66; G06N 99/005
USPC ......................................................... 700/295
See application file for complete search history.

(56) References Cited

U.S. PATENT DOCUMENTS

| | | | | |
|---|---|---|---|---|
| 8,367,984 B2* | 2/2013 | Besore | .................. | G06Q 50/06 219/490 |
| 8,892,264 B2* | 11/2014 | Steven | .................. | G06Q 50/06 700/286 |
| 2003/0050737 A1* | 3/2003 | Osann, Jr. | .............. | G05B 15/02 700/276 |
| 2008/0122585 A1* | 5/2008 | Castaldo | .................. | G06F 9/54 340/286.01 |
| 2009/0105888 A1* | 4/2009 | Flohr | ..................... | G06Q 30/00 700/295 |
| 2009/0195349 A1* | 8/2009 | Frader-Thompson | . | G01D 4/002 340/3.1 |
| 2012/0080949 A1* | 4/2012 | Gelonese | .................. | H02J 3/14 307/31 |
| 2013/0289788 A1* | 10/2013 | Gupta | ..................... | G05B 13/02 700/291 |
| 2016/0126950 A1* | 5/2016 | Lucantonio | ........ | H01R 13/6683 307/113 |

* cited by examiner

*Primary Examiner* — Ziaul Karim
(74) *Attorney, Agent, or Firm* — James M. Smedley LLC; James Michael Smedley, Esq.

(57) ABSTRACT

The present invention relates to a system and method for monitoring and reducing consumption of electricity with a network of smart sensors connected to either electrical devices and/or lights.

14 Claims, 5 Drawing Sheets

SYSTEM AND METHODS FOR MONITORING AND REDUCING THE CONSUMPTION OF ELECTRICITY WITH A NETWORK OF SMART SENSORS

FIELD OF THE INVENTION

The present invention relates to a system and method for monitoring and reducing consumption of electricity with a network of smart sensors connected to either electrical devices, electronic devices and/or lights.

BACKGROUND

There is a need in the art for a system and method for monitoring and reducing consumption of electricity with a network of smart sensors connected to either electrical devices, electronic devices and/or lights. These and other features and advantages of the present invention will be explained and will become obvious to one skilled in the art through the summary of the invention that follows.

SUMMARY OF THE INVENTION

Accordingly, it is an object of the present invention to provide a system and method for monitoring and reducing consumption of electricity with a network of smart sensors connected to either electrical devices, electronic devices and/or lights.

According to an embodiment of the present invention, a system for monitoring and reducing the consumption of electricity with a network of smart sensors includes: a network of sensors used to monitor consumption of electricity over a window of time for a plurality of appliances selected from the group comprising, large appliances and small appliances, heating appliances, boilers, hair dryers, irons, refrigerators, laundry machines, lights, television (TV), Digital Video Disc (DVD) or other media players, audio devices, video devices and other electronic or electrical devices, wherein the plurality of appliances are all controlled smart electrical and/or electronic devices.

According to an embodiment of the present invention, one or more sensors can be placed into power outlets, power plugs, light adapters, bulb sockets, or directly embedded in one or more of the appliances of the plurality of appliances.

According to an embodiment of the present invention, one or more sensors are connected via a network connection to a control server where periodic power consumption monitoring occurs and data therefrom is stored in a database.

According to an embodiment of the present invention, Internet protocols, phone networks or satellite networks are used to localize a geographical position of the network of sensors.

According to an embodiment of the present invention, the system further includes: an intelligent system running on the control server, wherein the intelligent system analyses consumption data and provides suggestions for reducing consumption of electricity, wherein machine learning based optimization criteria is used to reduce said consumption of electricity, wherein said criteria are selected from the group comprising, geographical location of each sensor, power consumption observed over a long period of time, power consumption observed in over a period of time, the power consumption observed over any interval of time, time of the day, external light conditions, presence and/or the movement of people in the area monitored by the sensor, cost of electricity in a particular location, cost of electricity in a particular moment of the time, the consume registered by that particular sensor, consumption registered by sensors in the network of sensors, consumption monitored by all sensors exceeding a desired total maximum, range of optimal voltage or amperage supported by an appliance, temperature registered by a sensor, smoke condition registered by a sensor, user-defined rules for each sensor, preferences expressed by users for specific machine learning optimization criteria, other user defined or algorithmically computed criteria.

According to an embodiment of the present invention, the suggestions for reducing the consumption of electricity is sent to each sensor device by the control server.

According to an embodiment of the present invention, sensors apply the suggestions for reducing the consumption of electricity by turning off one or more appliances.

According to an embodiment of the present invention, sensors are configured to reduce voltage or amperage of one or more appliances.

According to an embodiment of the present invention, sensors can dim light produced by one or more appliances.

According to an embodiment of the present invention, sensors can delay operation of one or more appliances by a given temporal interval.

According to an embodiment of the present invention, sensors can switch off one or more appliances in response to temperature monitored by the sensors.

According to an embodiment of the present invention, sensors are configured to switch off all of the appliances in the plurality of appliances upon detection of smoke.

According to an embodiment of the present invention, sensors are configured to switch off all of the appliances in the plurality of appliances in accordance to a user defined rule.

According to an embodiment of the present invention, sensor status, controller server status and all suggestion recommendations can be accessed via a network system through the use of a smart browser or a web browser for reporting statistical information, metrics and other information.

According to an embodiment of the present invention, the network system utilizes one or more protocols selected from the group comprising HTTP, HTTPS, Atom and RSS.

According to an embodiment of the present invention, the sensors are configured to alter one or more of said plurality of appliances, such that the appliances enter a reduced consumption state where one or more non-critical function is suspended.

According to an embodiment of the present invention, a method for monitoring and reducing the consumption of electricity with a network of smart sensors includes the steps of: receiving consumption information from a plurality of sensors, wherein each sensor is associated with an appliance, electrical device or electronic device; analysing consumption information received from said plurality of sensors; reviewing consumption data in light of criteria, wherein said criteria are selected from the group comprising, geographical location of each sensor, power consumption observed over a long period of time, power consumption observed in a short period of time, the power consumption observed over any interval of time, time of the day, external light conditions, presence and/or the movement of people in the area monitored by the sensor, cost of electricity in a particular location, cost of electricity in a particular moment of the time, the consume registered by that particular sensor, consumption registered by sensors in the network of sensors, consumption monitored by all sensors exceeding a desired total maximum, range of optimal voltage or amperage supported by an appliance, temperature registered by a sensor, smoke condition registered by a sensor, user-defined rules for each sensor, preferences expressed by users for specific machine learning optimization criteria, other user defined or algorithmically computed criteria; generating optimized parameters for each sensor based on said consumption data and said criteria; and providing said optimized parameters to said plurality of sensors, wherein said optimized parameters cause each sensor to alter control of said appliance, electrical device or electronic device associated with the sensor.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED SPECIFICATION

Figure 1:
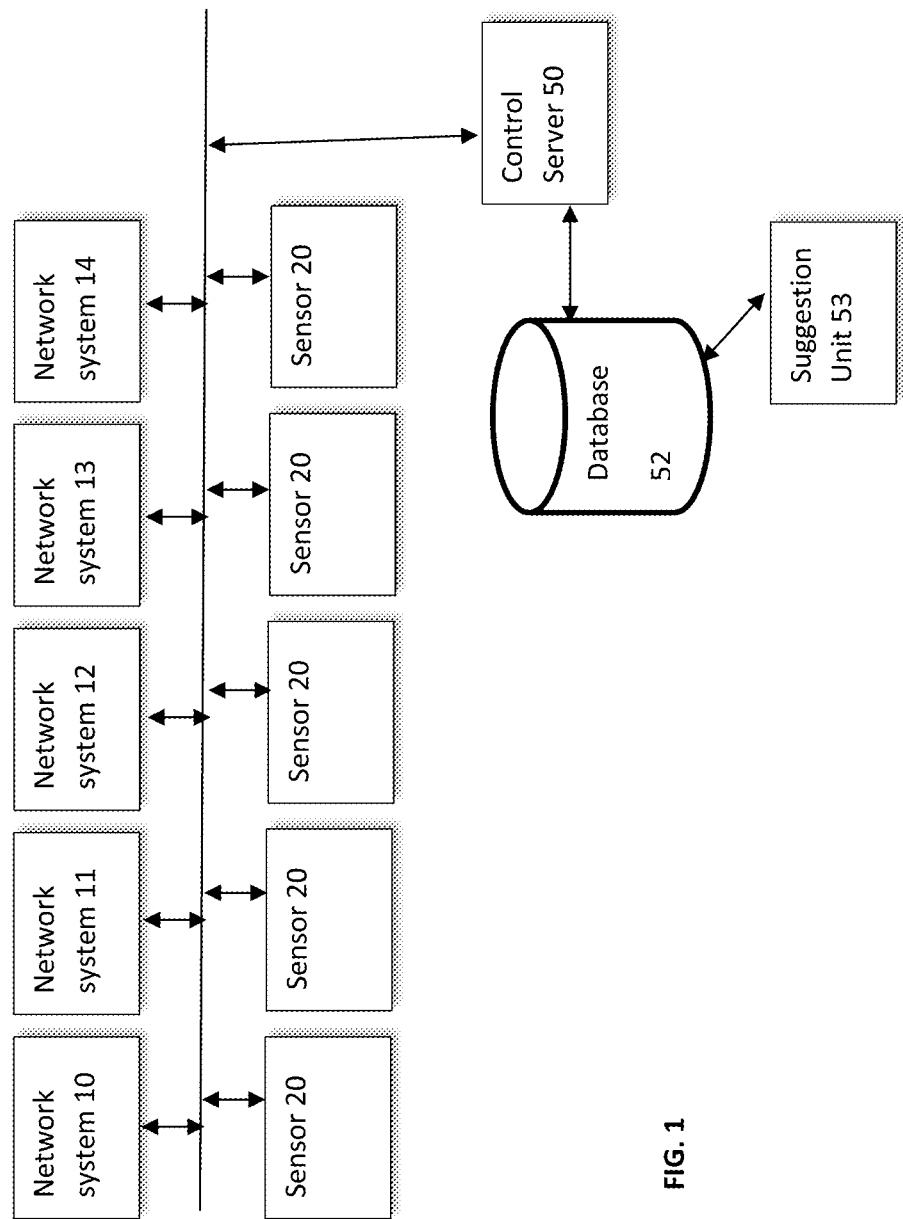
FIG. 1 is diagram of an illustrative network environment suitably for monitoring and reducing the consumption of electricity with a network of smart sensors.
Figure 2:
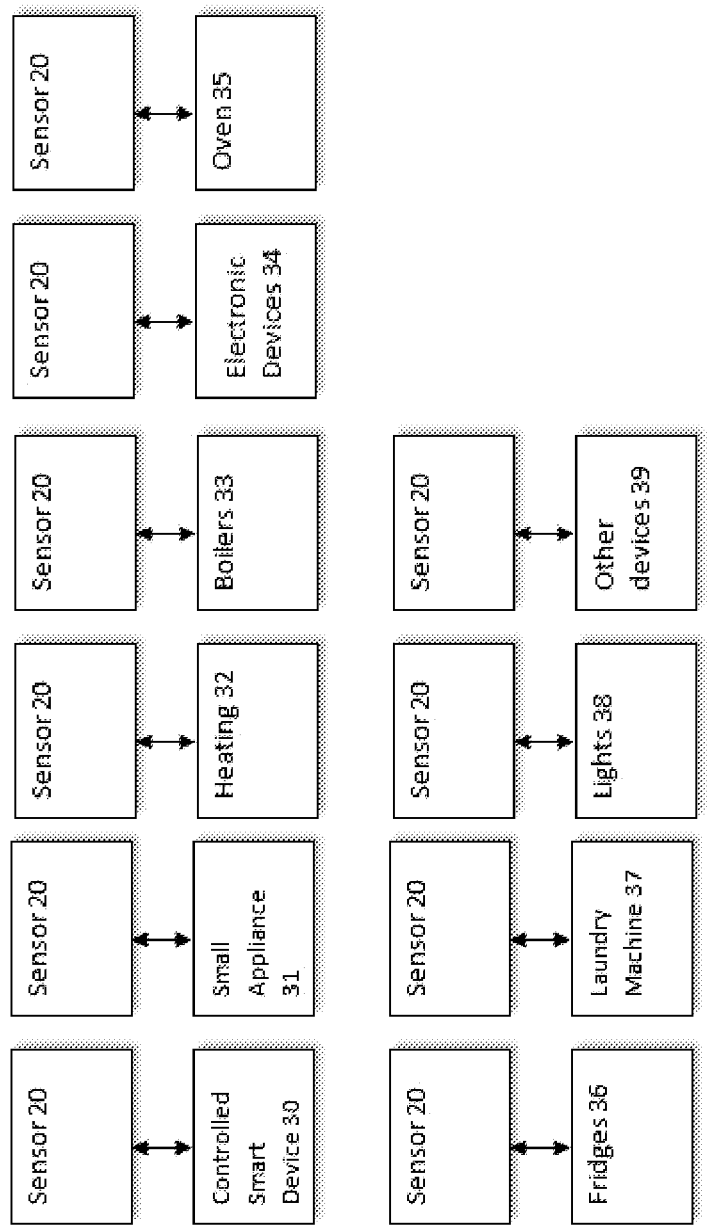
FIG. 2 is a pictorial diagram illustrating typical combination of sensors and devices.
Figure 3:
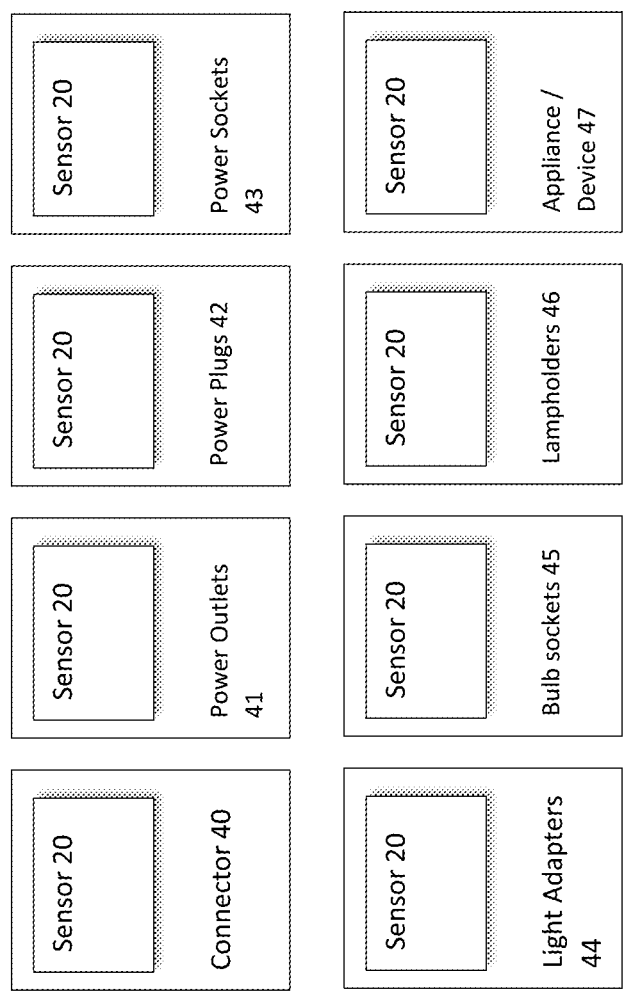
FIG. 3 is a pictorial diagram illustrating typical combination of sensors and connectors.

According to an embodiment of the present invention, a system and method for monitoring and reducing consumption of electricity with a network of smart sensors connected to either electrical devices and/or lights is provided.

The network of smart sensors is comprised of the following components:

A mobile internet network system 10 (such as WIFI, WIMAX, and others), or a mobile phone network system 11 (such as GSM/GPRS, UMTS, 4G and others), or a satellite network system 12 (such as GPS and others), or an internet network system 13 (such as LAN, WAN, ZigBee, Bluetooth and power lines using the TCP/IP protocol), or a combination thereof, can be used in accordance with one embodiment of the present invention. It would be appreciated that other types of mobile network 14 can be used with one embodiment of this invention. It will be appreciated that the network 14 can be one among 10, 11, 12, 13, 14 or a different mobile network. It will be appreciate that the network 14 can use encryption for secure communication.

A plurality of sensors 20 are connected to networks 10, 11, 12, 13, 14 or to a combination thereof.

Each sensor monitor the consumption of electricity over a window of time for a plurality of devices 30, large and small appliances 31 (hair dryer 31.1, iron 31.2, washing machines 31.3 and other small appliances 31.4), heating 32 (air conditioning 32.1, ventilation 32.3, heating 32.3), boilers 33, electronic devices 34 (TV 34.1, radio 34.2, game consoles 34.3, computers 34.4, dvd player 34.5, audio systems 34.6, video systems 34.7), ovens 35, fridges 36, laundry machines 37, lights 38 (including but not limited to LED lights 38.1, neon lights 38.2, traditional bulbs 38.3, incandescent lights 38.4), and others electrical devices 39. It will be appreciated that the plurality of controlled smart electrical devices 30 can be one or more among 30, 31, 31.1, 31.2, 31.3, 31.4, 32, 32.1, 32.2, 32.3, 33, 34, 34.1, 34.2, 34.3, 34.4, 34.5, 34.6, 34.7, 35, 36, 37, 38, 38.1, 38.2, 38.3, 38.4, 39 or a different appliance/light/device). These appliances, lights and others devices are defined as controlled smart electrical and/or electronic devices. It should be appreciated that each sensor can control one or multiple smart electrical and/or electronic devices. It will be appreciated that the plurality of controlled smart electrical and/or electronic devices 30 can be one or more among 30, 31, 31.1, 31.2, 31.3, 31.4, 32, 32.1, 32.2, 32.3, 33, 34, 34.1, 34.2, 34.3, 34.4, 35, 36, 37, 38, 38.1, 38.2, 38.3, 38.4, 39 or a different appliance/light/device.

Each sensor can be placed into connectors 40 such as power outlets 41, power plugs 42, power sockets 43, light adapters 44, bulb sockets 45, lamp holders 46, or directly embedded in the appliances/devices 47. It will be appreciated that the connectors 40 can be one or more among 40, 41, 42, 43, 44, 45, 46, and 47.

A control server 50, or a set of distributed cloud control servers 51, is connected to a database 52. The control server 50, or a set of distributed cloud control servers 51, is connected to the plurality of sensors 20 via the network 13.

The control server 50 is typically a computer system, and may be an HTTP/HTTPS/REST/Atom server. The distributed cloud control servers 51 are computers systems, connected via the cloud and may be HTTP/REST/Atom servers. It will be appreciated that the server 50 can be one among 50 and 51.

The database 52 is typically a software program which is used to store and retrieve consumption of electricity as registered by the plurality of sensors 20.

The database 52 includes a suggestion unit 53, which computes suggestions for reducing the consumption of electricity. Different machine learning based optimization criteria can be used such as one of, or a combination of (a) the geographical location of each sensor, (b) the power consumption observed over an interval of time, (c) the time of the day, (d) the external light conditions (night/day/sunrise), (e) the presence and/or the movement of people in the area monitored by the sensor, (f) the cost of electricity in that particular location, (g) the cost of electricity in that particular moment of the time (hour, day of the week, month, year), (h) the consumption registered by that particular sensor, (i) the consumption registered by the remaining sensors in the network of sensors, (l) the consumption monitored by all the sensors exceeding a desired total maximum, (m) the range of optimal voltage or amperage supported by the particular appliance, (n) the temperature registered by the sensor, (m) the smoke condition registered by the sensor, (o) user-defined rules for each sensor in 20 and for the related smart controlled devices in 30, (p) preferences expressed by the users for specific machine learning optimization criteria, (q) other user defined or algorithmically computed criteria. While various machine learning based optimization criteria of the disclosed subject matter have been described, it should be appreciated that these aspects are exemplary and should not be construed as limiting. Variations and alterations to the various aspects may be made without departing from the scope of the disclosed subject matter.

Indeed, many (if not all) of the components of 50, 51, 52, 53 should be viewed as logical components for carrying out various functions. These logical components may or may not correspond directly to actual components. Moreover, in an actual embodiment, these components may be combined together or broke up across multiple actual components. Further still, these components (both logical and actual) may be distributed across one or more cooperative computer systems.

At regular or at random time interval, the plurality of sensors 20 send to the control server 50 via the network system 13 the monitor information collected for electricity consumption of the controlled smart electrical and/or electronic devices 30. This information is used for data analysis, metrics, statistics and suggestion feedback.

The control server 50 continuously stores consumption of electricity as registered by the plurality of sensors 20 into the database 52 and uses the suggestion unit 53 for computing suggestions on how to reduce the consumption of electricity. Those suggestions are sent back to each sensor in 20 via the network system 13.

Each sensor in the network of sensor 20 applies these suggestions by switching off the controlled smart electrical and/or electronic devices 30, in accordance to the suggestion produced by the suggestion unit 53 and sent via the network system 13.

In yet another embodiment, the sensor device in 20 can reduce the voltage of the controlled smart electrical and/or electronic devices 30, in accordance to the suggestion produced by the suggestion unit 53 and sent via the network system 13.

In yet another embodiment, the sensor device in 20 can reduce the amperage of the controlled smart electrical and/or electronic devices 30, in accordance to the suggestion produced by the suggestion unit 53 and sent via the network system 13.

In yet another embodiment, the sensor device in 20 can dimmer the light produced by the controlled smart electrical device 30, in accordance to the suggestion produced by the suggestion unit 53 and sent via the network system 13. Dimming can be either for either reducing the brightness of the lights according to the ambient light available or changing the colour of the light according to the ambient light available.

In yet another embodiment, the sensor device in 20 can delay the operation of switching on the controlled smart electrical device 30 by a given temporal interval, in accordance to the suggestion produced by the suggestion unit 53 and sent via the network system 13.

In yet another embodiment, the sensor device in 20 can switch off the controlled smart electrical device 30 if no person is close to the sensor 20, in accordance to the suggestion produced by the suggestion unit 53 and sent via the network system 13.

In yet another embodiment, the sensor device in 20 can control the smart electrical device 30 switching off and on the heating, the ventilation, the air conditioning, in accordance to the suggestion produced by the suggestion unit 53 and sent via the network system 13.

In yet another embodiment, the sensor device in 20 can switch off the controlled smart electrical or electronic device 30 in response to the temperature monitored by the sensor 20, in accordance to the suggestion produced by the suggestion unit 53 and sent via the network system 13.

In yet another embodiment, the sensor device in 20 can switch off all the controlled smart electrical and/or electronic devices 30 if one sensor in 20 detect smokes, in accordance to the suggestion produced by the suggestion unit 53 and sent via the network system 13. In this case the control server 50 can emit an alarm via the network system 13.

In yet another embodiment, the sensor device in 20 can switch off all the controlled smart electrical and/or electronic devices 30 if one sensor in 20 detect smoke, in accordance to the suggestion produced by the suggestion unit 53 and sent via the network system 13.

In yet another embodiment, the sensor device in 20 can switch off all the controlled smart electrical and/or electronic devices 30, in accordance to a user-defined rule memorized in the suggestion unit 53 and sent via the network system 13.

In yet another embodiment, the sensor device in 20 can dimmer the light produced by the controlled smart electrical and/or electronic devices 30, in accordance to a user defined rule memorized in the suggestion unit 53 and sent via the network system 13.

In yet another embodiment, the sensors are configured to alter an appliance or a controlled smart electrical and/or electronic device 30 so that it enter a reduced consumption state where one or more non-critical function is suspended.

In yet another embodiment, the status of all the sensor device in 20, the status of the controller server 50 and all the suggestion recommended by the unit 53 can be accessed via the network system 13 by a smart browser or a web browser typically with HTTP, HTTPS or other protocols.

In yet another embodiment, the status of all the sensor device in 20, the status of the controller server 50 and all the suggestions recommended by the unit 53 in a given window of time elapsed in the past can be accessed via the network system 13 by a smart phone 60 or a web browser 61 typically with HTTP, HTTPS or other internet protocols. It will be appreciated that statistical information, metrics and other information can be reported to the client during those accesses.

In yet another embodiment, the suggestions recommended by the unit 53 and accessed by the smart phone 60 or the web browser 61 can be expressly liked by the user accessing them via the network system 13. The suggestion unit 53 might use those preferences for fine-tuning the machine learning based optimization criteria.

While various novel aspects of the disclosed subject matter have been described, it should be appreciated that these aspects are exemplary and should not be construed as limiting. Variations and alterations to the various aspects may be made without departing from the scope of the disclosed subject matter.

A network of sensors is used to monitor the consumption of electricity over a window of time for a plurality of appliances, large and small, heating, boilers, hair dryer, iron, fridges, laundry machines, lights (including but not limited to LED lights, neon lights, traditional bulbs, incandescent lights), and others. These appliances, lights and others are defined as controlled smart electrical and/or electronic devices.

Sensors can be placed into power outlets, power plugs, light adapters, bulb sockets, or directly embedded in the appliances.

Sensors are connected via a network connection to control server or a set of distributed cloud control servers where the periodic power consumption monitoring is stored in a database.

Internet protocols, or phone networks, or satellite networks might be used to localize the geographical position of a network of sensors An intelligent system running on the control servers analyse the consumption and provide suggestions for reducing the consumption of electricity. Different machine learning based optimization criteria can be used such as one of, or a combination of the geographical location of each sensor, the power consumption observed over a long period of time, the power consumption observed over any interval of time, the power consumption observed in a short period of time, the time of the day, the external light conditions (night/day/sunrise), the presence and/or the movement of people in the area monitored by the sensor, the cost of electricity in that particular location, the cost of electricity in that particular moment of the time (hour, day of the week, month, year), the consumption registered by that particular sensor, the consumption registered by the remaining sensors in the network of sensors, the consumption monitored by all the sensors exceeding a desired total maximum, the range of optimal voltage or amperage supported by the particular appliance, the temperature registered by the sensor, the smoke condition registered by the sensor, user-defined rules for each sensor, preferences expressed by the users for specific machine learning optimization criteria, other user defined or algorithmically computed criteria. One of ordinary skill in the art would appreciate that machine learning methodologies may include, but are not limited to, neural networks, deep learning, svm, boosted random trees and others. Embodiments of the present invention are contemplated for use with any appropriate machine learning technique.

The suggestions for reducing the consumption of electricity is sent to each sensor device by the control server(s). Each sensor device applies these suggestions by turning off the controlled smart electrical and/or electronic devices described in claim 1. In another embodiment of this invention the sensor device can reduce either the voltage or the amperage of the controlled smart electrical and/or electronic devices described in claim 1. In yet another embodiment, the sensor device can dimmer the light produced by the controlled smart electrical device. In yet another embodiment, the sensor device can delay the operation of switching on the controlled smart electrical device by a given temporal interval. In yet another embodiment, the sensor device in can switch off the controlled smart electrical device in response to the temperature monitored by the sensor. In yet another embodiment, the sensor device in 20 can switch off all the controlled smart electrical and/or electronic devices if one sensor detects smokes. In yet another embodiment, the sensor device can switch off all the controlled smart electrical and/or electronic devices, in accordance to a user defined rule. In yet another embodiment, the sensor device can alter an appliance or a controlled smart electrical and/or electronic device 30 so that it enter a reduced consumption state where one or more non-critical function is suspended.

The status of all the sensor device, the status of the controller server and all the suggestion recommended can be accessed via the network system by a smart browser or a web browser typically with HTTP, HTTPS or other protocols for reporting statistical information, metrics and other information.

Users can be expressly like the algorithmically inferred machine learning based optimization criteria thus reinforcing their importance as relevant suggestions.

Figure 4:
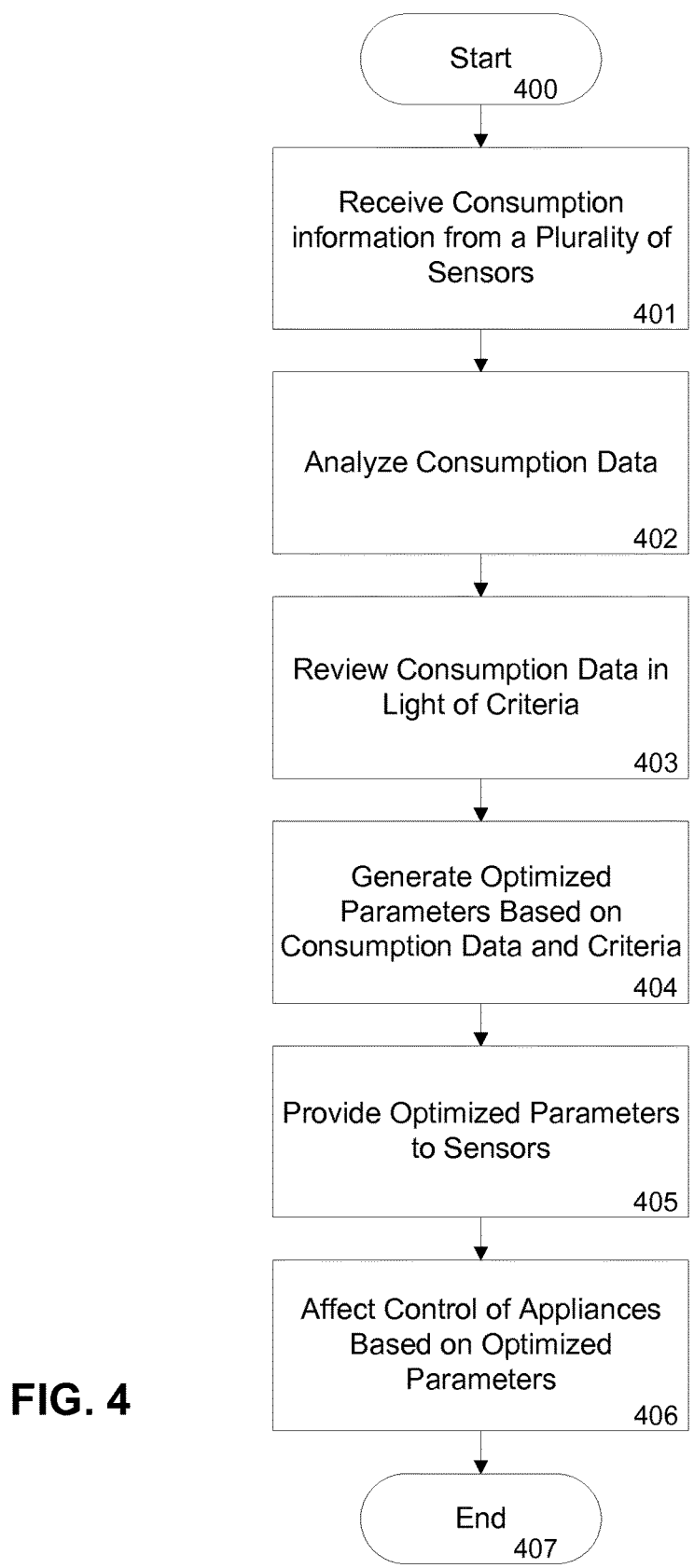
FIG. 4 is a process flow depicting an exemplary method, in accordance with an embodiment of the present invention.

Turning now to FIG. 4, an exemplary method in accordance with an embodiment of the present invention is shown by way of a process flow. The method starts at step 400 wherein a system for monitoring and reducing the consumption of electricity with a network of smart sensors is engaged.

At step 401, the system receives consumption information from a plurality of sensors. In some embodiments, the system may be configured to query the sensors for consumption information or other data. In other embodiments, each sensor may provide information to the system based on one or more configured events, such as, but not limited to, occurrence of a set time, periodically (e.g., every second, every minute, every 5 minutes, every 10 minutes, every hour, every day), crossing of a set threshold of a variable (e.g., temperature, humidity, amperage), detection of a hazard (e.g., carbon monoxide, excessive heat) or any combination thereof. One of ordinary skill in the art would appreciate that there are numerous methods for receiving consumption information from sensors, and embodiments of the present invention are contemplated for use with any such method.

Further, consumption information received in step 401 could relate not only to the consumption of electricity, but also could include other sensor related information, such as light conditions in the environment surrounding the sensor, temperature in the environment surrounding the sensor, other sensor data (e.g., motion detection, Hall effect detection), other sensor information (e.g., date/time as noted by sensor, location of the sensor). One of ordinary skill in the art would appreciate that there are numerous types of information that could be provided by the sensors to the system for analysis, and embodiments of the present invention are contemplated for use with any type of information provided by the sensors.

At step 402, the system analyses the consumption data received from the sensors and organizes the received data for later use. The system may also store the information, such as in a database or other computer readable medium, for providing historical analysis of sensor data and use in generating consumption reduction plans or consumption reduction operative states in order to reduce electrical consumption throughout the connected appliances, electrical and electronic devices.

At step 403, the system reviews the consumption data in light of appropriate criteria as detailed previously herein. In preferred embodiments, this step may include the use of machine learning based optimization techniques for the purpose of analysing sensor data in light of specified criteria in order to improve efficiency, efficacy or other performance metric.

At step 404, the system generates optimized parameters for one or more appliances, electrical devices or electronic devices associated with the sensors. Generation of the optimized parameters for the system is based on the sensor data received and the criteria utilized by the system as detailed previously herein. The optimized parameters may include altering one or more characteristics, operative modes or settings of the appliances, electrical devices or electronic devices associated with each sensor.

At step 405 the system transmits optimized parameters to one or more sensors connected to the system. The optimized parameters provide the sensors with information related to how a related appliance, electrical device or electronic device can be altered in order to improve consumption or performance.

At step 406, each sensor that received optimized parameters utilizes those parameters to affect a change in an appliance, electrical device or electronic device associated with the sensor. The altering of an appliance, electrical device or electronic device can be affected as described herein. For example, a sensor may alter an appliance or a controlled smart electrical and/or electronic device 30 so that it enter a reduced consumption state where one or more non-critical function is suspended. At step 407, the process would then terminate.

Figure 5:
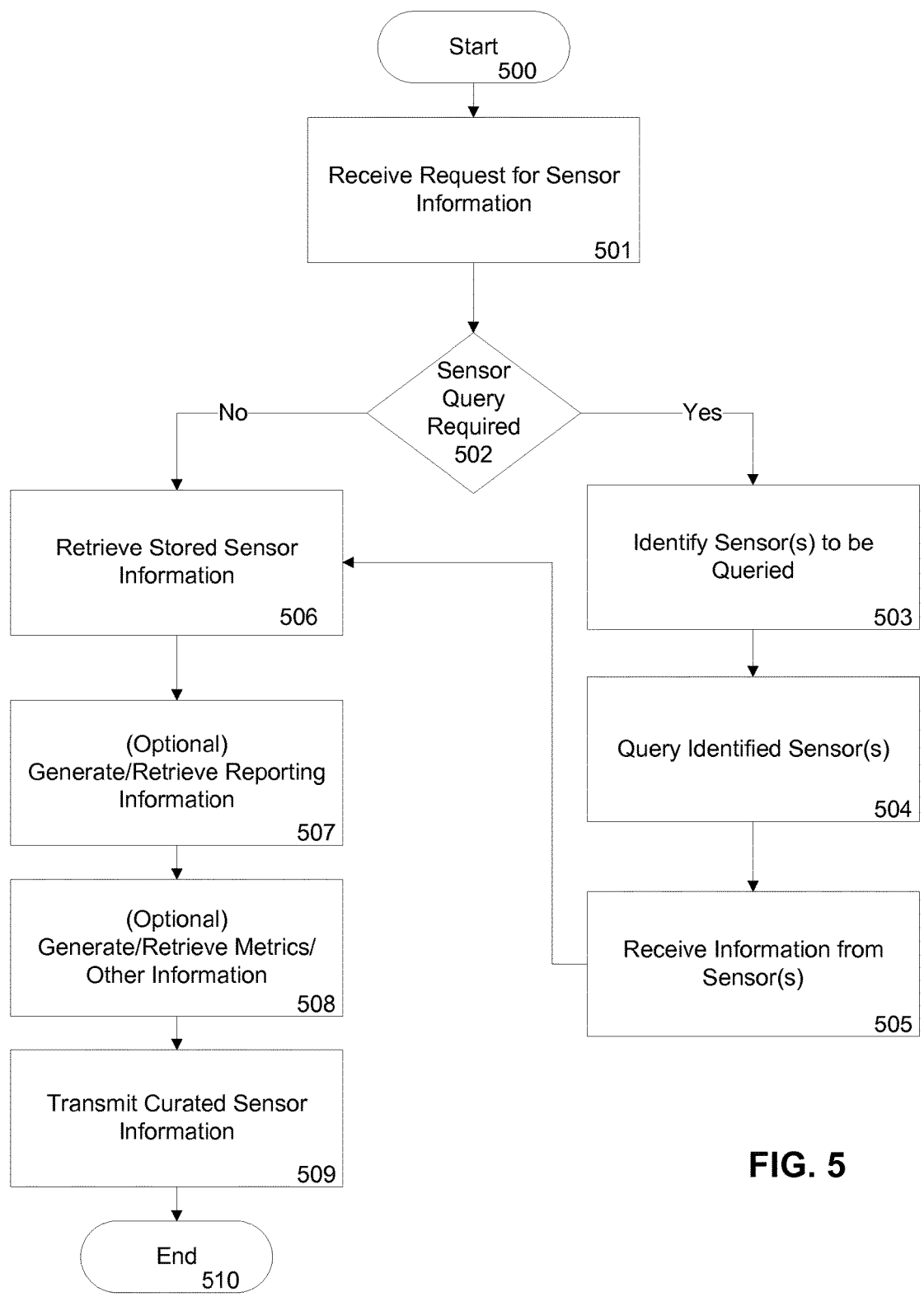
FIG. 5 is a process flow depicting an exemplary method, in accordance with an embodiment of the present invention.

Turning now to FIG. 5, an exemplary method in accordance with an embodiment of the present invention is shown by way of a process flow. The method starts at step 400 wherein a system for monitoring and reducing the consumption of electricity with a network of smart sensors is engaged.

At step 501, the system receives a request to for sensor information. The request may be from, for instance, a user desiring to see sensor status, controller server status, suggestion recommendations, reporting information, metrics, other information or any combination thereof.

At step 502, the system determines if the request requires information from one or more sensors, such as a request for current status of a sensor. If current sensor information is required, the system first identifies the sensor(s) to be queried (step 503), such as by pulling an identifier (e.g., IP address) from a database of stored identifiers, and sends a query to the sensor(s) for the requested information (step 504).

At step 505, the system receives the requested data from the sensor(s). At this point, whether or not the request required querying of sensor(s), the system moves to step 506, wherein the system retrieves any necessary stored sensor information. Stored sensor information could be any type of sensor information detailed herein.

Optionally, at step 507, the system generates and/or retrieves any reporting information identified in the request. Further, at optional step 508, the system generates and/or retrieves any other requested information, such as statistical information or metrics. One of ordinary skill in the art would appreciate that there are numerous types of information that could be generated and retrieved for provision in response to a request for sensor information.

Finally, at step 509, the system transmits the information requested to the requested in a curated format. A curated format is detailed as information formatted in the appropriate form to respond to the request. In some cases, this may be object code or hypertext markup language (HTML). In other cases, it may be information formatted in a serialized format for consumption by a third-party system (e.g., JSON, XML). In other cases, it may be provided by one or more application programming interfaces (API). One of ordinary skill in the art would appreciate that there are numerous ways in which the information could be curated and transmitted to the requester. At this point, the process ends at step 510.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A system for monitoring and reducing the consumption of electricity with a network of smart sensors, the system comprising:
    a control server configured to make suggestions on how to reduce consumption of electricity;
    a network of sensors configured to: (1) monitor consumption of electricity by each of a plurality of appliances, (2) change the applied voltage to at least one of said monitored appliances, (3) change the amperage to at least one of said monitored appliances and (4) control at least one of said monitored appliances by causing said appliance to reduce its power consumption by suspending non-critical functions and dimming light produced by said appliance,
    wherein the plurality of appliances are smart electrical and/or electronic devices,
    wherein one or more sensors from among said network of sensors are connected via a network connection to a control server where periodic power consumption monitoring occurs and power consumption data therefrom is stored in a database,
    wherein said control server sends suggestions for reducing electricity to each of said sensors via said network;
    wherein said power consumption data is reviewed according to a plurality of criteria, said criteria consisting of: geographical location of each sensor, power consumption observed over an interval of time, time of the day, external light conditions, presence and/or the movement of people in the area monitored by the sensor, cost of electricity in a particular location, cost of electricity in a particular moment of the time, the consumption registered by that particular sensor, consumption registered by sensors in the network of sensors, consumption monitored by all sensors exceeding a desired total maximum, range of optimal voltage or amperage supported by an appliance, temperature registered by a sensor, and smoke condition registered by a sensor,
    wherein optimized parameters for each sensor are generated based on results of said review of power consumption data,
    wherein optimized parameters are provided to said plurality of sensors, and said optimized parameters cause said sensors to alter control of at least one of said appliances,
    wherein Internet protocols, phone networks, or satellite networks are used to localize a geographical position of at least one of the sensors.

2. The system of claim 1, wherein one or more sensors can be placed into power outlets, power plugs, light adapters, bulb sockets, or directly embedded in one or more of the appliances of the plurality of appliances.

3. The system of claim 1, further comprising:
an intelligent system running on the control server, wherein the intelligent system analyses consumption data and provides suggestions for reducing consumption of electricity,
wherein machine learning based optimization criteria is used to reduce said consumption of electricity,
wherein said criteria are selected from the group consisting of: geographical location of each sensor, power consumption observed over an interval of time, time of the day, external light conditions, presence and/or the movement of people in the area monitored by the sensor, cost of electricity in a particular location, cost of electricity in a particular moment of the time, the consumption registered by that particular sensor, consumption registered by sensors in the network of sensors, consumption monitored by all sensors exceeding a desired total maximum, range of optimal voltage or amperage supported by an appliance, temperature registered by a sensor, smoke condition registered by a sensor, user-defined rules for each sensor, and preferences expressed by users for specific machine learning optimization criteria.

4. The system of claim 3, wherein the suggestions for reducing the consumption of electricity is sent to each sensor device by the control server.

5. The system of claim 4, wherein sensors apply the suggestions for reducing the consumption of electricity by turning off one or more appliances.

6. The system of claim 4, wherein sensors can delay operation of one or more appliances by a given temporal interval.

7. The system of claim 4, wherein sensors can switch off one or more appliances in response to temperature monitored by the sensors.

8. The system of claim 4, wherein sensors are configured to switch off all of the appliances in the plurality of appliances upon detection of smoke.

9. The system of claim 4, wherein sensors are configured to switch off all of the appliances in the plurality of appliances in accordance to a user defined rule.

10. The system of claim 4, wherein sensor status, controller server status and all suggestion recommendations can be accessed via a network system through the use of a smart browser or a web browser for reporting statistical information, metrics and other information.

11. The system of claim 10, wherein the network system utilizes one or more protocols selected from the group comprising HTTP, HTTPS, Atom and RSS.

12. The system of claim 4, wherein the sensors are configured to alter one or more of said plurality of appliances, such that the appliances enter a reduced consumption state where one or more non-critical function is suspended.

13. A method for monitoring and reducing the consumption of electricity with a network of smart sensors, the method comprising the steps of:
connecting a plurality of sensors via a network connection to a control server, wherein said sensors are configured to (1) monitor consumption of electricity by each of a plurality of appliances which include electronic and electrical devices, (2) change the applied voltage to at least one of said monitored appliances, (3) change the amperage to at least one of said monitored appliances, and (4) control at least one of said monitored appliances by causing said appliance to reduce its power consumption by suspending non-critical functions and dimming light produced by said appliance;
transmitting suggestions for reducing electricity to each of said sensors via said network;
periodically performing power consumption monitoring of said appliances using the plurality of sensors, wherein said monitoring comprises periodically receiving consumption information from the plurality of sensors;
storing the received consumption information in a database;
analyzing power consumption data received from the plurality of sensors;
reviewing the power consumption data according to a plurality of criteria, said criteria consisting of: geographical location of each sensor, power consumption observed over an interval of time, time of the day, external light conditions, presence and/or the movement of people in the area monitored by the sensor, cost of electricity in a particular location, cost of electricity in a particular moment of the time, the consumption registered by that particular sensor, consumption registered by sensors in the network of sensors, consumption monitored by all sensors exceeding a desired total maximum, range of optimal voltage or amperage supported by an appliance, temperature registered by a sensor, and smoke condition registered by a sensor;
generating optimized parameters for each sensor based on said review of power consumption data;
providing said optimized parameters to said plurality of sensors, wherein said optimized parameters cause said sensors to alter control of at least one of said appliances; and
localizing a geographical position of at least one of the sensors using Internet protocols, phone networks, or satellite networks.

14. The method of claim 13, wherein at least one sensor of said plurality of sensors can delay operation of one or more appliances, electrical devices or electronic devices by a given temporal interval.

* * * * *